United States Patent [19]

Robinson et al.

[11] Patent Number: 6,034,810
[45] Date of Patent: Mar. 7, 2000

[54] FIELD EMISSION CHARGE CONTROLLED MIRROR (FEA-CCM)

[75] Inventors: William P. Robinson, Thousand Oaks; Michael J. Little, Oakpark; Eric A. Gifford, Newbury Park, all of Calif.

[73] Assignee: MEMSolutions, Inc., Westlake Village, Calif.

[21] Appl. No.: 09/172,612

[22] Filed: Oct. 15, 1998

Related U.S. Application Data

[63] Continuation-in-part of application No. 09/069,122, Apr. 29, 1998, Pat. No. 5,926,309, which is a continuation of application No. 08/844,248, Apr. 18, 1997, Pat. No. 5,768,009.

[51] Int. Cl.$^7$ .............................. G02B 26/02; G02B 26/08
[52] U.S. Cl. .......................... 359/293; 359/223; 359/298
[58] Field of Search .................................. 359/293, 223, 359/224, 298, 291, 292, 295, 262; 313/309; 348/781, 782

[56] References Cited

U.S. PATENT DOCUMENTS

| | | | |
|---|---|---|---|
| 2,681,380 | 6/1954 | Orthuber | 178/5.4 |
| 2,682,010 | 6/1954 | Orthuber | 315/8 |
| 2,733,501 | 2/1956 | Orthuber et al. | 29/25.17 |
| 3,517,126 | 6/1970 | Yamada et al. | 178/7.5 |
| 3,600,798 | 8/1971 | Lee | 29/592 |
| 3,678,196 | 7/1972 | Roth | 178/7.5 D |
| 3,746,911 | 7/1973 | Nathanson et al. | 315/21 R |
| 3,886,310 | 5/1975 | Guldberg et al. | 178/7.5 D |
| 3,896,338 | 7/1975 | Nathanson et al. | 315/373 |
| 4,229,732 | 10/1980 | Hartstein et al. | 340/378.2 |
| 4,387,964 | 6/1983 | Arrazola et al. | 350/331 R |
| 4,441,791 | 4/1984 | Hornbeck | 350/360 |
| 4,592,628 | 6/1986 | Altman et al. | 350/486 |
| 4,615,595 | 10/1986 | Hornbeck | 353/122 |
| 4,680,579 | 7/1987 | Ott | 340/783 |
| 4,698,602 | 10/1987 | Armitage | 332/7.51 |
| 4,710,732 | 12/1987 | Hornbeck | 332/7.51 |
| 4,728,174 | 3/1988 | Grinberg et al. | 350/334 |
| 4,744,636 | 5/1988 | Haven et al. | 350/331 R |
| 4,765,717 | 8/1988 | Buzak et al. | 350/331 R |
| 4,784,883 | 11/1988 | Chitewood et al. | 428/1 |
| 4,786,149 | 11/1988 | Hoenig et al. | 350/356 |
| 4,805,038 | 2/1989 | Seligson | 358/296 |
| 4,826,293 | 5/1989 | Grinberg et al. | 350/331 R |
| 4,884,874 | 12/1989 | Buzak et al. | 350/336 |
| 4,956,619 | 9/1990 | Hornbeck | 330/4.3 |
| 5,083,857 | 1/1992 | Hornbeck | 359/291 |
| 5,142,405 | 8/1992 | Hornbeck | 359/226 |

(List continued on next page.)

OTHER PUBLICATIONS

S. Newman, et al., "Development of a 5.1 Inch Field Emission Display," Motorola Flat Panel Display Division, SID 1998.

Lawrence Dworsky, et al. "Field Emission Display Technology and Applications," Motorola Flat Panel Display Division, SID 1998.

B. Chalamala et al., "Fed up with Fat Tubes," IEEE Spectrum, vol. 35, No. 4, p. 41–51, Apr. 1998.

R. Noel Thomas et al., "The Mirror–Matrix Tube: A Novel Light Valve for Projection Displays," IEEE Transactions on Electron Devices, vol. ED–22, No. 9, Sep. 1975, p. 765.

J.A. van Raalte, "A New Schlieren Light Valve for Television Projection," Applied Optics vol. 9, No. 10. (Oct. 1970), p. 2225.

*Primary Examiner*—Georgia Epps
*Assistant Examiner*—Margaret Burke
*Attorney, Agent, or Firm*—Fleshner & Kim

[57] ABSTRACT

A bright, high contrast, compact, large area, high-resolution light modulator uses a field emitter array (FEA) to address a charge controlled mirror (CCM). The FEA deposits a charge pattern onto the CCM, which in turn produces electrostatic forces that deflect the micromirrors in accordance with the amount of accumulated charge. The CCM that is used in combination with the FEA can be configured in many different ways to implement different actuation modes, e.g. attractive, repulsive, grid-actuated or membrane-actuated and different charge control modes, e.g. RC decay, RC sustain and charge control.

38 Claims, 6 Drawing Sheets

U.S. PATENT DOCUMENTS

| | | | |
|---|---|---|---|
| 5,172,262 | 12/1992 | Hornbeck | 359/223 |
| 5,196,767 | 3/1993 | Leard et al. | 315/349 |
| 5,280,277 | 1/1994 | Hornbeck | 345/108 |
| 5,287,215 | 2/1994 | Warde et al. | 359/293 |
| 5,416,514 | 5/1995 | Janssen et al. | 348/196 |
| 5,442,414 | 8/1995 | Janssen et al. | 353/98 |
| 5,444,566 | 8/1995 | Gale et al. | 359/291 |
| 5,448,314 | 9/1995 | Hemibuch et al. | 348/743 |
| 5,452,024 | 9/1995 | Sampsell | 348/755 |
| 5,471,341 | 11/1995 | Warde et al. | 359/293 |
| 5,477,110 | 12/1995 | Smith et al. | 315/169.3 |
| 5,493,439 | 2/1996 | Engle | 359/292 |
| 5,504,614 | 4/1996 | Webb et al. | 359/223 |
| 5,508,738 | 4/1996 | Janssen et al. | 348/196 |
| 5,552,925 | 9/1996 | Worley | 359/230 |
| 5,557,177 | 9/1996 | Engle | 315/366 |
| 5,567,334 | 10/1996 | Baker et al. | 216/24 |
| 5,579,151 | 11/1996 | Cho | 359/291 |
| 5,600,383 | 2/1997 | Hornbeck | 348/771 |
| 5,610,478 | 3/1997 | Kato et al. | 315/169.1 |
| 5,631,782 | 5/1997 | Smith et al. | 359/871 |
| 5,650,881 | 7/1997 | Hornbeck | 359/871 |
| 5,669,687 | 9/1997 | Yang | 353/98 |
| 5,677,784 | 10/1997 | Harris | 359/290 |
| 5,689,278 | 11/1997 | Barker et al. | 345/74 |
| 5,706,061 | 1/1998 | Marshall et al. | 348/743 |
| 5,768,009 | 6/1998 | Little | 359/293 |
| 5,774,196 | 6/1998 | Marshall | 348/743 |
| 5,903,243 | 5/1999 | Jones | 345/7 |
| 5,903,804 | 5/1999 | Kirkpatrick et al. | 399/154 |

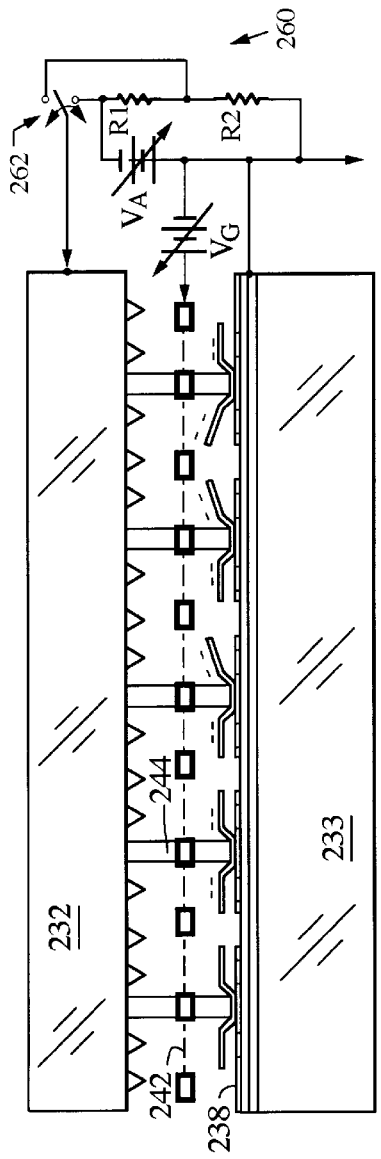
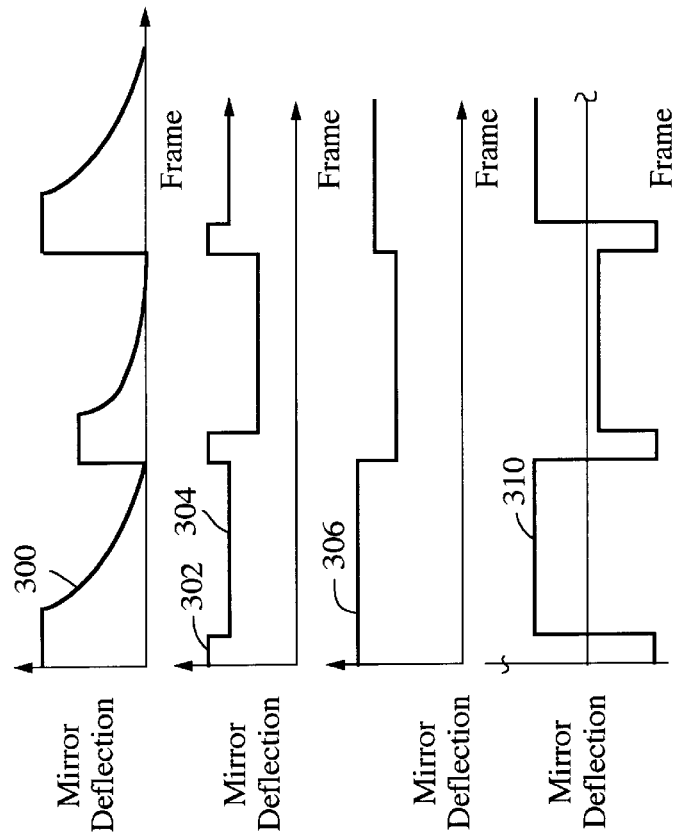
FIG. 11
FIG. 12a
FIG. 12b
FIG. 12c
FIG. 12d

FIELD EMISSION CHARGE CONTROLLED MIRROR (FEA-CCM)

RELATED APPLICATION

This is a continuation-in-part of application Ser. No. 09/069,122 filed Apr. 29, 1998 entitled "Light Valve Target Comprising Electrostatically-Repelled Micro-Mirrors", now U.S. Pat. No. 5,926,309 which is hereby incorporated by reference, which itself is a continuation of Ser. No. 08/844,248 filed Apr. 18, 1997 also entitled "Light Valve Target Comprising Electrostatically-Repelled Micro-Mirrors" and now U.S. Pat. No. 5,768,009.

BACKGROUND OF THE INVENTION

1. Field of the Invention

This invention relates to field emission displays (FEDs) and more specifically to a light modulator technology that employs a field emitter array (FEA) to address a charge controlled mirror (CCM)

2. Description of the Related Art

Image displays are used to convert electrical signals into viewable images. The most common technology used in both projection and direct-view displays is the cathode ray tube (CRT), in which a scanning electron gun shoots a single beam of electrons across a vacuum to scan a phosphor-coated anode. The electrons penetrate the individual phosphors causing them to emit light and taken together produce a direct view image. By necessity, the gun must sit far from the anode to raster scan the phosphor screen, a distance similar to the width of the display area. As a result, high-resolution large area direct-view displays are correspondingly very large and very heavy.

During the past 40 years numerous attempts have been made to construct a "Flat-CRT", which can overcome the length and weight limitations of the conventional CRT without sacrificing performance. With few exceptions, these efforts have failed commercialization due to serious complexities in the electron source and mechanical structure, but a new alternative called the Field Emission Display (FED) has recently appeared that has shown promise in overcoming these barriers. The FED utilizes a matrix addressed cold cathode array, spacers to support the atmospheric pressure, and cathodoluminescent phosphors for efficient conversion of the electron beam into visible light. The non-linearity of the current/voltage relationship permits matrix addressing of high information content displays while providing high contrast ratio.

The FED combines the best properties of CRTs (full color, full greyscale, brightness, video rate speeds, wide viewing angle and wide temperature range) with the best attributes of Flat Panel technology (thin and light weight, linearity and color convergence). However, the current production FEDs have limited display sizes, 10 inch diagonal or less, due to the fabrication and vacuum packaging problems. Since the primary motivation for Flat-CRTs was to overcome the size and weight limitations of the conventional CRT for large display sizes, this is a serious problem to successful commercialization of the FED technology.

To appreciate FEDs, one must understand the physics of field emission. The potential barrier at the surface of a metallic conductor binds electrons to the bulk of the material. This potential barrier is called the work function, and is defined as the potential difference between the Fermi level and the height of the barrier. For an electron to leave the material, the electron must gain an energy that exceeds the work function. This can be accomplished in a number of ways, including thermal excitation (thermionic emission), electron and ionic bombardment (secondary emission), and the absorption of photons (photoelectric effect). Fowler-Nordheim emission or field emission differs from these other forms of emission in that the emitted electrons do not gain an energy that exceeds the material work function.

Field emission occurs when an externally applied electric field at the material surface thins the potential barrier to the point where electron tunneling occurs, and thus differs greatly from thermionic emission. Since there is no heat involved, field emitters are a "cold cathode" electron source. One needs to apply an electric field on the order of 30–70 MV/cm at the surface of a metallic conductor to produce significant tunneling current. For example, if an electrode is placed 1 um from the surface of a conductor it would take 1000 V between the electrode and cathode to induce significant current flow.

Obviously, a flat-panel display (FPD) that is addressed at 1000 V is of little use. Therefore, "field enhancement" is used to lower the necessary addressing voltages.

A field emitter is a sharp point, or whisker, with a connecting cathode electrode, a dielectric layer, and an isolated extraction gate in close proximity. If a positive potential is applied between the gate and cathode, a uniform electric field is produced in the dielectric. But the presence of the sharp tip emitter produces a compression of the equipotential lines at the tip, and thus a high electric field. Field enhancement is a geometric property and is strongly dependent on the sharpness of the tip. Note that the dielectric must hold off the un-enhanced field, so field enhancement is essential for operation of field emitters. With field enhancement, a reasonable voltage applied to the extraction gate results in electron emission at the point.

As shown in FIG. 1, a vacuum packaged FED 10 includes a matrix-addressed cold cathode array 12, spacers 14 that support atmospheric pressure and a cathodoluminescent anode 16. Cathode array 12 is composed of row and column conductors separated by an insulating layer (not shown) with interspersed field emitter tips 17. These layers are deposited on an insulating substrate 18, such as glass. The locations where the rows and column cross define a pixel. The row conductors serve as the extraction gate and the column conductors connect to the cathodes.

Anode 16 is the phosphor screen and is composed of phosphor powders 20, which are typically deposited within a black matrix on a glass substrate 22. The entire anode 16 is covered with a thin aluminum layer, which bleeds off the electrons that bombard the screen and returns them to the power supply. The cathode and screen, along with spacer materials, are aligned, sealed, and evacuated to complete the vacuum package.

Electron emission from each pixel is controlled by a forward bias between the gate and cathode. Once released from the confines of the bulk material, the emitted electrons are accelerated toward the phosphor screen. A focusing grid (not shown), which is biased at a positive potential with respect to the cathode, is often used to focus the electrons as they are accelerated toward the screen. The voltage applied to the screen must be higher than the cathode voltage or the emitted electrons. The screen voltage must also be high enough so that most of the electrons' energy remains once they penetrate the aluminum layer covering the phosphor particles.

As shown in FIG. 1 and in more detail in FIG. 2, drive electronics 24 are needed to control operation of the vacuum package and specifically cathode array 12. The drive electronics subsystems include a power module 26, a video controller 28, panel controller 30, and row and column drivers 32 and 34, respectively. The component subsystems will differ depending on whether the input is analog or digital.

For an analog composite video signal containing red, green, and blue (RGB) information and timing signals, video controller 28 samples the analog video signal, digitizes it, and separates it into RGB components. Horizontal and vertical timing information is also extracted from the composite input. Video controller 28 then presents the digitized video information to panel controller 30 in the form required by a standard digital video interface specification. This standard specifies digital RGB data up to 18 bits in parallel, horizontal and vertical sync, a pixel clock, and a data valid signal. Other processing that may be required in the video controller are gamma correction and adjustment of color saturation, brightness, and contrast.

In order to keep the FED compatible with other FPD technologies that accept digital input, panel controller 30 must accept the standard digital-interface signals and extract the signals necessary to drive the FED row and column drivers 32 and 34. In most cases, the signals appearing at the digital interface are used directly by the row and column drivers, and the functionality of the panel controllers is minimal. However, depending on the drive approach used and on the design of the drivers, some functionality may be required on the panel.

Line-by-line addressing is used to display an image on the FED. Typically, the row connections are the FED gates, and the columns are the FED cathodes. The rows are scanned sequentially from top to bottom. As each row is selected, the columns are used to modulate the current in the pixels of the selected row. This results in dwell times much longer than those produced by the flying spot of a conventional CRT. The longer dwell time permits lower pixel current for a given brightness, thus eliminating the problems of beam divergence and phosphor saturation that occur in high-brightness CRT's.

The voltage applied across the pixel is the difference between the row-select voltage and the column voltage. For a typical FED, a gate-cathode voltage of approximately 80 V is required to achieve full "white" brightness. The pixel OFF current for black level is 50 V or less. The modulation voltage used to control the intensity of each pixel is the difference between the white and black levels, or about 30 V. From a functional standpoint, the row driver is a very simple circuit that provides only a row-select signal as the display is scanned from one line to the next. The column driver presents gray-scale image information to the pixel and differs from the row driver both in functional complexity and bandwidth performance.

There is more than one way to modulate the pixel intensity with the column driver, and there are tradeoffs with each approach, including power consumption, susceptibility to cathode defects, ability to drive the required load, and display uniformity. The leading approaches are amplitude modulation (AM), pulse-width modulation (PWM), and a mixed AM/PWM approach. Each of these approaches can be used with column drivers configured as either voltage or current sources.

Although Flat-CRTs have been demonstrated and produced in limited quantities using FED technology, the FED industry faces serious problems in the fabrication and vacuum assembly of the field emitter arrays due to the inherent limitations of emissive displays. To get a very bright display the phosphors must be driven at high power levels, which shortens the phosphor lifetime dramatically. It is well known in the projector arena that phosphor displays reach their one-half brightness level after the first year of use. In addition, the alignment of the RGB phosphors for a color display can be tricky. Furthermore, the voltages required to penetrate the aluminum coating and operate the phosphors at these levels shorten the expected lifetime of the field emitters. Due to this rapid aging FEDs are not suitable for projection displays.

As a result, FEDs are currently limited to direct-view displays such as television and computer displays, in which 27 and 17 inch and larger displays are quite common. Unfortunately the thin and thick film processes used to fabricate the cathode and anode structures, respectively, are incompatible. It is very difficult to marry the clean thin-film process with the dirty thick-film process to produce a clean device on which a vacuum can be pulled and maintained over the lifetime of the display. The large display sizes and high resolutions required to meet consumer demand exacerbate this problem by increasing the total surface area of the phosphors, hence the number of hiding places for contaminants that can out gas over time.

The spacers in a FED must be mechanically strong and stable, be compatible with a surrounding vacuum and have a high breakdown voltage. In addition, their electrical resistance must be high enough to minimize leakage current between anode and cathode. Yet the resistance has also to be low enough for charge buildup to dissipate. Currently, the spacers are fabricated separately and then positioned on the anode using a robotic pick and place procedure, which is time consuming and very expensive. The described packaging and performance limitations have impaired the industry's ability to produce an FED having a large display area that is very bright and maintains that brightness over its lifetime.

Leard et al., U.S. Pat. No. 5,196,767 discloses an optical signal processor that uses a matrix-addressable field emitter array to supply controlled electron emission to a two-dimensional signal processor element such as a deformable reflective membrane as described in U.S. Pat. No. 5,287,215 or a liquid crystal array. The optical signal processor is particularly suited for applications in adaptive optics, optical computing, target recognition, tracking and signal processing and optical communications.

SUMMARY OF THE INVENTION

In view of the above problems, the present invention provides a thin, bright, high contrast, scalable, video quality light modulator that exhibits uniform performance over an extended lifetime at a relatively low cost.

This is accomplished with a vacuum packaged field emission charge controlled mirror (FEA-CCM) display in which an array of field emitters address a charge controlled mirror. The field emitters (at least one per micromirror) are driven to deliver primary electrons that strike and deposit a charge pattern onto the CCM, which produces electrostatic forces that deflect the micromirrors. A collector grid collects the secondary electrons that are ejected from the CCM. The spacers that support the vacuum package are preferably formed in mirror post regions and support the collector grid as well. The FEA-CCM can be assembled by either fabricating the CCM and FEA separately and mating them together or by fabricating the CCM on the FEA and then bonding the structure to a glass faceplate.

Numerous electrostatic actuation modes are contemplated including, but not limited to, attractive-mode, repulsive-mode, membrane-actuated and grid-actuated. In addition, several techniques are available to erase or reset the micromirrors between video frames including, but not limited to, RC-decay, dual-energy addressing, charge control, differential charge control and dual deflection charge control.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 11 is a sectional view of a collector-grid actuated FEA-CCM with beam energy control; and FIGS. 12a–12d are plots of mirror deflection for the different addressing modes.

DETAILED DESCRIPTION OF THE INVENTION

The present invention provides a thin, extremely bright light modulator that uses a field emitter array (FEA) in combination with a charge controlled mirror (CCM) that are sealed entirely within a vacuum cell. The field emission charge controlled mirror (FEA-CCM) is not limited by the phosphors' brightness and aging characteristics. The ability of the FEA to independently address pixel and sub-pixel sites can be exploited to improve frame time utilization and beam-to-mirror alignment, which increases display brightness and resolution.

Because the beams do not have to penetrate the phosphors' aluminum coating, the field emitters can be operated at much lower beam energies. This extends the life of the field emitters, relaxes the high voltage requirements on the fabrication process, particularly the spacers, and provides flexibility to optimize mirror geometry. In addition, the spacers may be formed as an integral part of the CCM thereby avoiding the pick-and-place procedure and improving fill factor. Furthermore, the FEA-CCM can employ a color sequential mode in which one mirror is used for red, green and blue, and thus avoid alignment problems.

Of particular importance, the CCM is fabricated using a thin-film process that is compatible with the thin-film process used to fabricate the field emitters. As a result, it will be much easier to pull and maintain a clean vacuum on the FEA-CCM. This makes large display sizes possible. The FEA-CCM can be assembled by fabricating the CCM and FEA separately, aligning and bonding them together, and then pulling a vacuum on the assembled device. Alternately, the FEA and CCM can be fabricated in one process, bonded to a glass faceplate, and sealed under vacuum.

FEA-CCM Architecture

Figure 1:
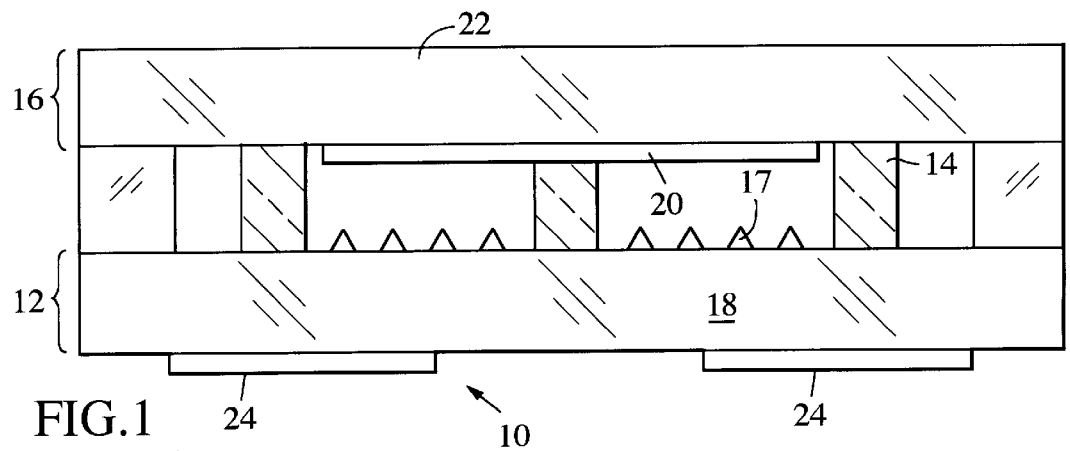
FIG. 1, as described above, is a sectional view of a known FED.
Figure 2:
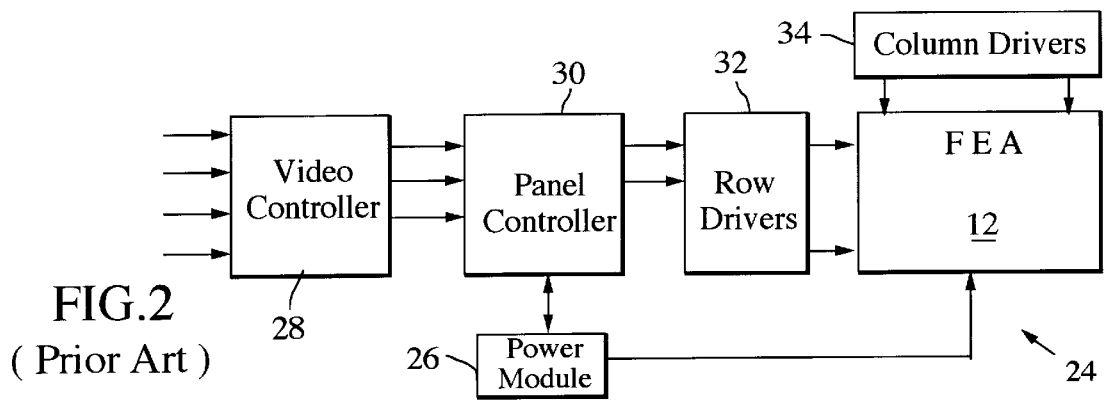
FIG. 2, as described above, is a schematic block diagram of the drive electronics for the FED shown in FIG. 1.
Figure 3:
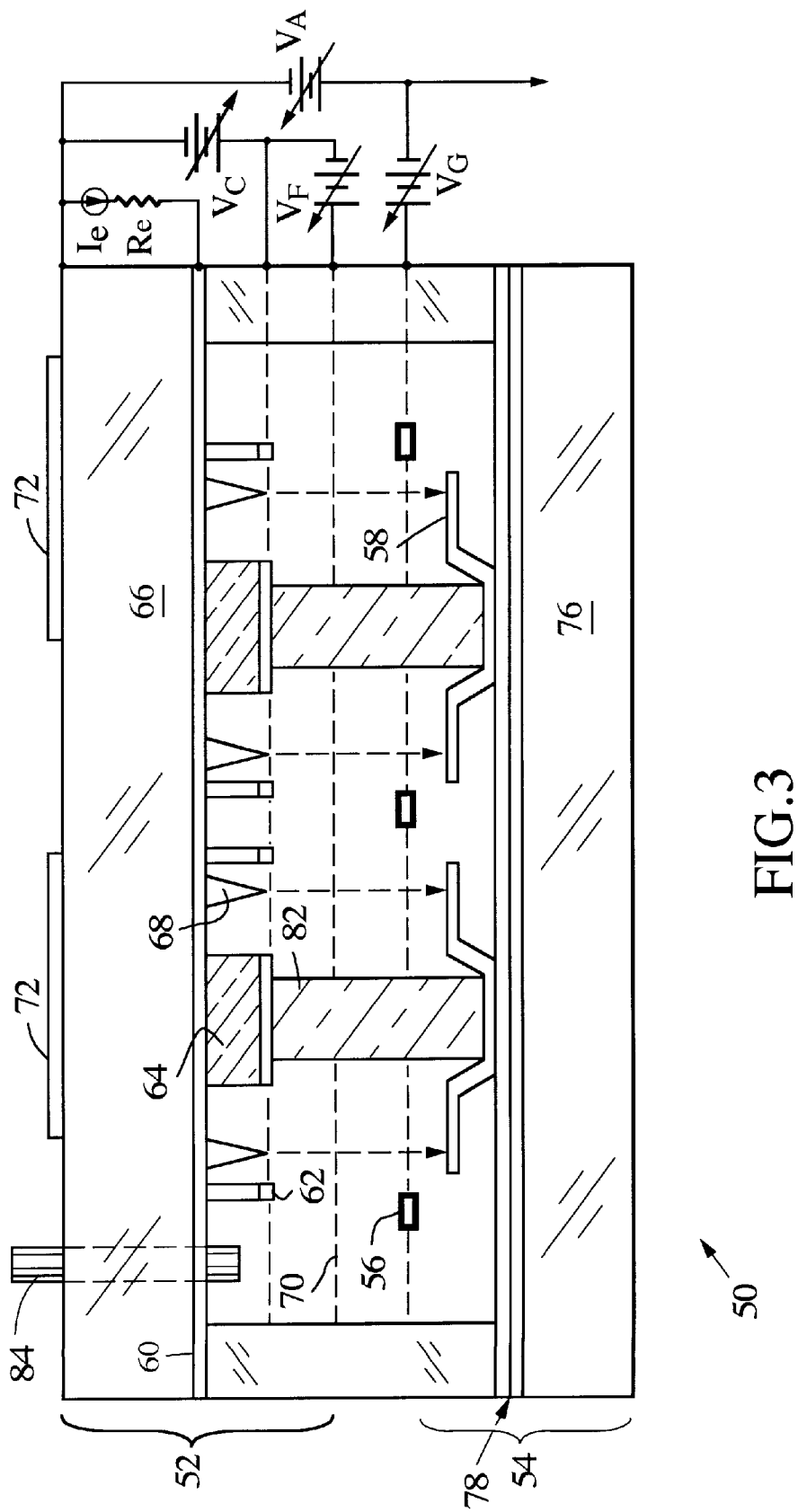
FIG. 3 is a sectional view of a micromirror field emission display (FEA-CCM) in accordance with the present invention.

As shown in FIG. 3, a vacuum packaged FEA-CCM 50 uses a FEA 52 of the type shown in FIG. 1 in combination with a CCM 54. FEA 52 emits primary electrons, which are focused and accelerated through a potential VA to strike CCM 54. The accelerated primary electrons eject secondary electrons, which are collected by a collector grid 56. The controlled modulation of FEA 52 combined with the collection of secondary electrons forms a charge pattern on CCM 54 that produces electrostatic forces that deflect an array of cantilevered micromirrors 58. The numerous CCM configurations and modes of electrostatic actuation contemplated by the invention are described in detail below with reference to FIGS. 5–12.

FEA 52 is composed of row and column conductors 60 and 62, respectively, which are separated by an insulating layer 64, and define individual pixels where they cross. These layers are deposited on an insulating substrate 66, such as glass. The patterned column conductor and insulating layers expose the underlying row conductors 60, which support field emitter tips 68 with their sharp points in close proximity to column conductors 62.

The row conductors 60 serve as the cathodes for the field emitters, and the column conductors 62 connect to the extraction gates. If a positive potential is applied between the extraction gate and cathode, the emitter produces a compression of the equipotential lines at the tip 68, which results in electron emission from the sharp cathode tip. An accelerating focusing grid 70 that is held at a relatively positive potential $V_F$ focuses the primary electrons as they are accelerated across the gap.

Drive electronics 72 address the FEA 52 a line at a time by enabling the cathode 60 for each successive row, shown schematically as a current source $I_e$ and series resistor $R_e$, and simultaneously modulating the potential on each column conductor (extraction gate) 62, shown schematically as variable voltage source $V_C$. When a row is enabled, the emission current flows from the field emitter tips. The series resistor is there as a ballast to preclude current run away from the tip at high cathode beam currents. The external series resistor may be replaced with a resistive layer beneath the row conductors. Amplitude modulation is achieved by varying the voltage $V_C$ that is applied to each column using known amplitude and/or pulse width modulation techniques.

CCM 54 includes an array of cantilevered micromirrors 58 that are formed on a substrate 76 such as glass. One or more dielectric and/or conductive layers 78 may be formed between the mirrors 58 and the substrate 76 depending upon the selected actuation mode and charge control technique. As shown one of the layers forms the anode and is connected to ground reference potential. Alternately, this layer may be formed on the front surface of substrate 76. Collector grid 56 is supported above CCM 54 and held at a relatively positive potential $V_G$ to collect secondary electrons that are emitted in response to the impact of the primary electrons. Without the collector grid, the secondary electrons would redeposit themselves on the CCM and wash out the desired image. It may be possible to use a portion of the FEA's focusing grid 70 to perform the function of the collector grid thereby eliminating the need for an additional structure.

The CCM is fabricated using known thin-film semiconductor practices that allow the spacers (posts) 82 to be formed in the mirrors' post regions. This greatly reduces the fill factor problems encountered with known FEDs. In addition, the spacers can be used to support the collector grid 56 as shown in FIG. 3 and the mirrors themselves and other CCM structures as depicted in more detailed embodiments. In an alternate embodiment, the substrate can be formed with an array of dimples in which small glass balls are placed and remain due to Van der Waals forces. The glass balls can provide the mechanical support needed for the FEA.

The FEA is also fabricated using thin-film semiconductor practices, which are highly compatible with CCM fabrication. The FEA and CCM are aligned and bonded together. A pump out tube 84 in the rear glass penetrates the cavity. Once assembled, the cavity is pumped out at temperature and tube 84 sealed off to establish a vacuum similar to a CRT. Spacers 82 support the FEA and CCM against the atmospheric pressures. Alternately the FEA and CCM can be aligned and bonded in a vacuum chamber sufficiently large to enclose both in which case the pump out tube is not required.

Although not shown to scale, the FEA-CCM is a very thin device. The FEA and CCM substrates are suitably 2 mm thick, the substrate-to-mirror and mirror-to-grid spacings are on the order of 10 microns apiece, the collector grid-to-focus grid and focus grid-to-cathode spacings are approximately 2 microns each, and the field emitter tip is approximately 1 micron thick. The posts or spacers may have a 2 or 3:1 aspect ratio. The overall spacing is increased slightly if a membrane is inserted between the collector grid and mirrors to decouple the FEA and the mirrors. Conversely, the spacing is reduced slightly if the collector grid is part of the focusing grid.

Projection FEA-CCM

Figure 4:
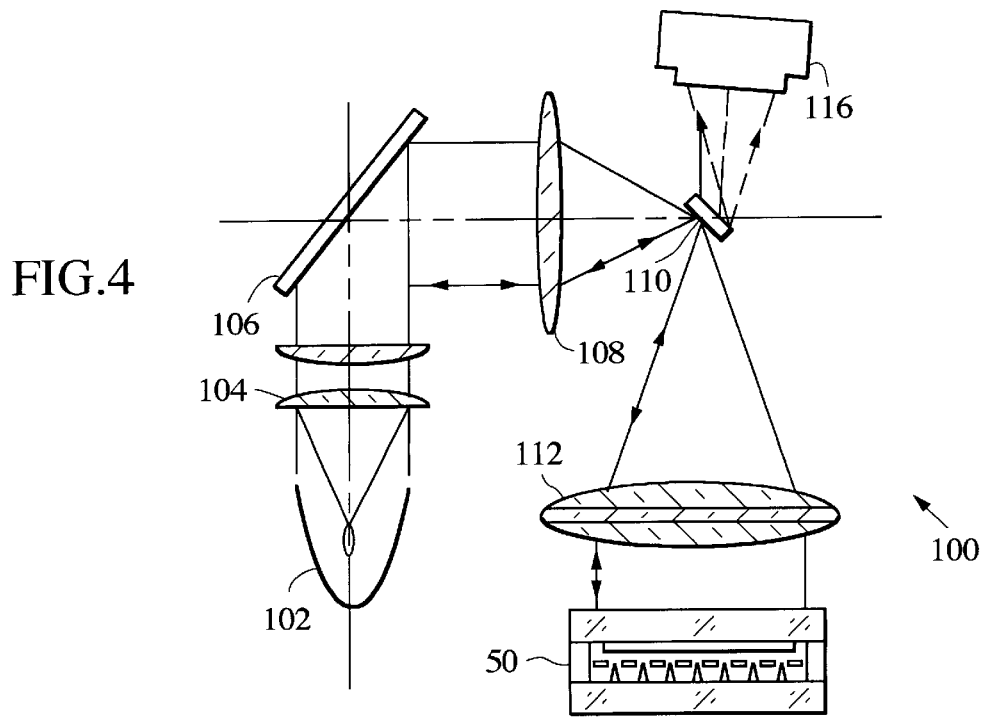
FIG. 4 is a schematic representation of a projection FEA-CCM system.

The basic FEA-CCM technology described above can be used in many different image display systems including, but not limited to, projection systems of the type shown in FIG. 4, non-emissive direct-view systems, i.e. "white paper" and flat-panel systems. The white paper and flat-panel systems may require modified mirror geometries to accommodate direct-view. It is contemplated that the FEA-CCM technology will also find application in other electro-optical fields.

As shown in FIG. 4, a monochrome projection FEA-CCM 100 includes a bright light source 102 such as an arc lamp with a reflector. One of the main advantages of this configuration is the fact that the display brightness is limited only by the size of the arc lamp that can be coupled to the FEA-CCM, not the emission properties of phosphors. The arc lamp produces divergent light, which is collimated by collection optics 104, selected to absorb the ultraviolet component of the light. A cold mirror 106 passes the infrared component of the light and directs the collimated "cold" light to a condenser lens 108, which focuses the collimated light onto a turning mirror/Schlieren stop 110. The turning mirror redirects the now diverging light onto a field lens 112, which recollimates the light and images it onto FEA-CCM 50. A color display can be implemented by positioning an RGB color wheel between cold mirror 106 and lens 108. This is commonly referred to as color sequential.

FEA-CCM 50, in response to a video addressing signal, imparts a spatial modulation onto the light in proportion to the amplitude of the deflection of the individual micromirrors. The spatially modulated light passes back through field lens 112 where it is focused onto a plane that extends through turning mirror/Schlieren stop 110. The Schlieren stop converts the spatially modulated beam into an intensity modulated beam that is then passed through a projection lens 116, which collimates the intensity modulated light and images it onto a screen.

The projection FEA-CCM provides a number of manufacturing advantages as compared to available phosphor FEDs. First, FEDs are simply not bright enough to be used in a projection system but, as mentioned previously, are limited to direct-view displays. As a result, the FEA-CCM diagonal measure in a projection system can be much smaller, typically 5 inches versus at least 27 inches for consumer television.

The advantages of a smaller display size are numerous. First, the total enclosed surface area is small so it is much easier to achieve and maintain a good vacuum. Second, it is much simpler and cheaper to handle and assemble 5 inch pieces of glass than 27 inch pieces of glass. Furthermore, for small displays it may be possible to fabricate the entire FEA-CCM on wafer thin glass since the front and back glass panels only require about a 40 mil thickness.

CCM Configurations

The CCM that is used in combination with the FEA can be configured in many different ways to implement different actuation modes, e.g. attractive, repulsive, grid-actuated or membrane-actuated and different charge control modes, e.g. RC decay, RC sustain, erase/write and differential control. The application, performance requirements and cost factors will dictate which configuration is best. Contrast ratio, electrostatic instability, charge efficiency, frame time utilization, optical efficiency, video performance, mirror uniformity, resolution, fill factor, fabrication complexity and cost are some of the key issues.

Attractive-Mode

In the early 1970s, Westinghouse Electric Corporation developed an electron gun addressed cantilever beam deformable mirror device, which is described in R. Thomas et al., "The Mirror-Matrix Tube: A Novel Light Valve for Projection Displays," ED-22 IEEE Tran. Elec. Dev. 765 (1975) and U.S. Pat. Nos. 3,746,911, 3,886,310 and 3,896, 338. The device was addressed by a low energy scanning electron beam that deposited a charge pattern on a cloverleaf mirror structure, causing the mirrors to be deformed toward a reference grid electrode on the substrate near the mirror edges by electrostatic actuation. The usefulness of the Westinghouse design was severely constrained by a) limited resolution due to the large beam spot sizes exhibited by the scanning gun at low energies, b) limited deflection range, and c) instability problems due to snap-over and stiction caused by Van der Waals forces.

Figure 5A:
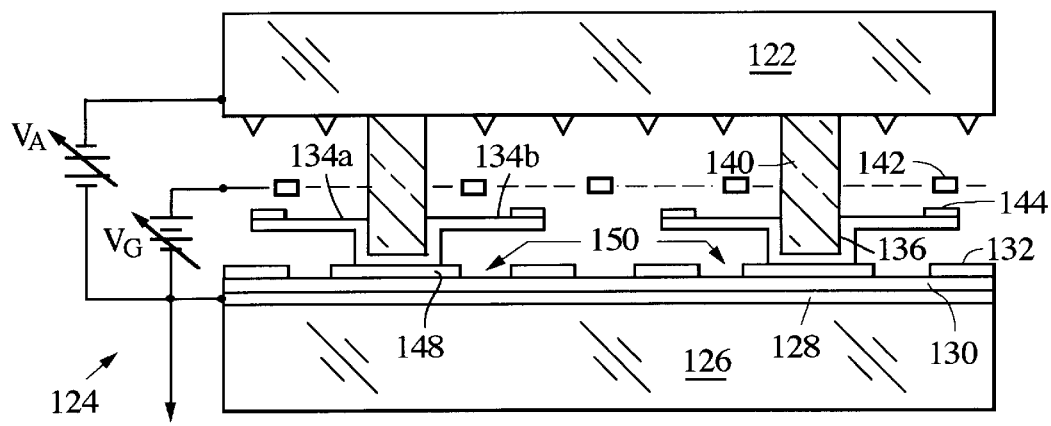
FIGS. 5a and 5b are respectively a sectional view of a FEA-CCM and a plan view of a cloverleaf mirror structure.
Figure 5B:
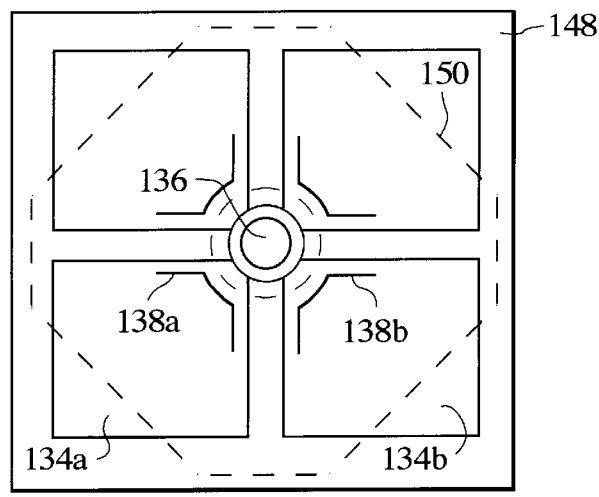

As shown in FIGS. 5a and 5b, the basic Westinghouse target has been modified to greatly improve deflection range and eliminate instability and, in combination with the FEA's small spot size, greatly enhance resolution. Deflection range is increased by shaping and positioning the reference electrode underneath the mirrors to increase the deflection range up to approximately 83% of the electrode-to-mirror spacing. Stability is improved by designing the CCM's micromirrors and biasing the secondary collector grid such that the grid potential $V_G$ is less than the mirrors' snap-over threshold potential Vth. The maximum mirror potential stabilizes at a value just slightly above $V_G$. The exact difference depends on the low energy spectrum of the secondary electrons and the electrode geometry. Since the mirror potential is effectively bounded below the threshold potential, the mirrors cannot snap-over due to electrostatic-attraction. This effectively increases the useful deflection range up to approximately 83% of the full electrode-to-mirror spacing. Without the self-limiting feature, the mirror could only be driven over a portion of the deflection range for fear of overshooting the threshold potential and causing snap-over.

A FEA-CCM 120 uses a FEA 122 of the type described above to address an attractive-mode CCM 124 within a vacuum. CCM 124 is formed on a glass substrate 126 that is coated with a buried conductive layer 128, suitably 300 Å of indium tin oxide (ITO), an insulating layer 130, suitably 3000 Å of $SiO_2$, and a conductive layer 132, suitably 300 Å of a thin conducting metal film or oxide. A mirror layer is patterned in a cloverleaf array of four centrally joined cantilever beams 134a, 134b, 134c and 134d that share a common post region 136, which suspends the beams suitably 3–15 microns above the substrate. The mirror layer is also patterned to define torsional flexion hinges 138a, 138b, 138c and 138d that join the respective cantilever beams to post region 136. Although other hinge designs are available, the torsional hinge is preferred because it gives higher compliance for a given fill factor. Insulating posts 140 are formed in post regions 136 to support a secondary electron collector grid 142 and support FEA 122 under vacuum.

In one embodiment, a secondary emission material can be patterned to define control pads 144 on beams 134 to improve frame time utilization. The mirror's pad and beam materials are selected so that at the landing energy of the primary electrons, the pad and beam exhibit opposite electron affinities, i.e. one is greater than unity and the other is less than unity. As a result, the selective addressing of the pad and cantilever beam cause the mirror potential to move up and down. For example, in an erase/write mode, the field emitters that are aligned with the control pad are first activated to drive the pixel potential to a desired reference potential, i.e. the erase state. The field emitters opposite the cantilever beam are then modulated to adjust the pixel potential away from the reference potential, i.e. the write state. In a differential write mode, the current pixel value is stored in memory and the next pixel value is written by addressing either the cantilever beam or the control pad. In either case, FTU approaches 100%. The known techniques of RC decay and switched collector grids can be used but sacrifice FTU.

The reference electrode, which provides the reference for forming the potential differences that attract the cantilever beams toward the substrate, is preferably created by patterning layer 132 to define an array of electrically isolated pads 148 that support the common posts 136. Pads 148 stabilize at the same potentials as their respective cantilever beams, and thus cannot produce an attractive force. Each pad 148 has four apertures 150 whose diagonals are a fraction, suitably 60%, of the mirror diagonal. In addition to increasing the useable portion of the deflection range, this configuration positions pad 148 directly beneath the tip of the mirror. Should the mirror snap-over due to an electrostatic or mechanical disturbance, the mirror will contact pad 148. Since the conductive pad and mirror are held at the same potential, there is no exacerbating mechanical force and the Van der Waals forces are minimized so that the mirror should not stick down.

The combination of buried layer 128, which is held at anode potential, insulating layer 130, and pads 148 creates a virtual reference electrode having the size and shape of aperture 150, i.e. the cantilever beam can see the electric field produced between itself and the buried layer through the aperture. When a charge pattern is written onto the mirrors, some of the charge will redistribute to pad 148 and thus not contribute to the attraction of the cantilever beam. However, most of the charge will remain on the underside of the cantilever beam above aperture 150 and produce an attractive force that deflects the beam toward the substrate.

The risk of electrostatic instability can be further reduced, if not eliminated, through proper mirror geometry and biasing conditions. It is commonly understood that in both constant-voltage (transistor addressed) and constant-charge (beam-addressed) snap-over will occur when the potential difference between the mirror and the reference electrode exceeds the threshold potential Vth, which is established by the mirror geometry. Note, the threshold potential, hence the critical deflection angle will be larger for a constant-charge mode of operation than for a constant-voltage mode. Should the potential difference exceed Vth, the attractive forces will overwhelm the restoring spring force of the cantilever beam, causing it to snap all the way to the base electrode. Although one would not intentionally drive the FEA to cause snap-over, the FEA potentially has a very high bandwidth and is thus susceptible to noise that could drive the mirror potential past the snap-over threshold.

Secondary electron collector grid 142 is biased at a positive potential $V_G$ with respect to the anode potential to establish a uniform electric field that helps carry the secondary electrons emitted from the micromirrors in response to the incident primary electrons to grid 142 where they are collected. Grid potential $V_G$ determines an upper bound on the mirror potential, which is just slightly higher than $V_G$. If the mirror potential should momentarily exceed the upper bound, the secondary electrons will redeposit themselves back on the mirror driving the mirror potential back to stabilized value.

Electrostatic instability is thus eliminated by configuring the mirror and the biasing conditions such that the grid potential $V_G$ is less than the threshold potential Vth. For increased assurance, the grid potential is preferably bounded away from the threshold potential so that $V_G<Vth-V_B$, where $V_B$ is a safety margin to account for the fact that the mirror potential will stabilize at a value slightly above $V_B$. As a result, the mirror potential can never exceed the threshold potential and cause snap-over. The elimination of snap-over problems in this manner has the secondary effect of effectively increasing the useable deflection range. The mirrors can be driven over their entire deflection range, whether that is 33% or 83% of the mirror-to-substrate gap, without the risk of overshooting and causing snap-over. Since contrast ratio and reliability are two of the major performance indicators on which displays are evaluated and are two of the main reasons the Westinghouse design was inadequate, the modified attractive mode CCM when used in combination with a FEA represents a substantial improvement in display technology.

Repulsive-Mode

U.S. Pat. No. 5,768,009 entitled "Light Valve Target Comprising Electrostatically-Repelled Micromirrors," from which priority is claimed, describes a micromirror target that utilizes electrostatic repulsion to actuate the mirrors and suggests addressing the target with a FEA. Repulsive actuation is very attractive because the structures are simple, the deflection range is not limited by hinge height, and the danger of snap-over is eliminated. However, as will be explained in more detail below, the charge efficiency of repulsive actuation as compared to attractive actuation is poor.

Figure 6:
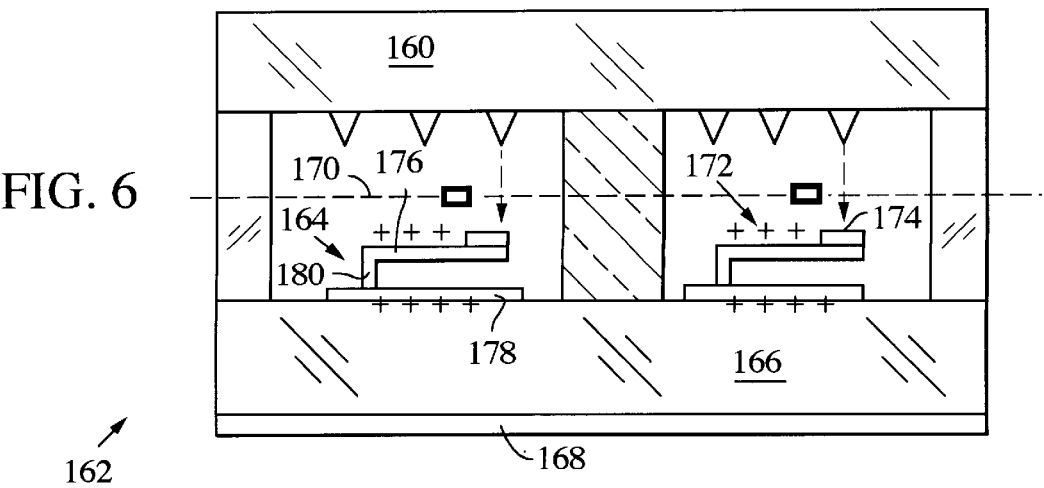
FIG. 6 is a sectional view of a repulsive mode FEA-CCM.

As shown in FIG. 6, the FEA-CCM uses a FEA 160 of the type described above to address a repulsive-mode CCM 162 within a vacuum. An array of electrically isolated micromirrors 164 are formed on a glass substrate 166, which is preferably coated with a conductive layer 168 that forms the anode. The emitted electrons are accelerated through a potential $V_A$ toward the anode and strike micromirrors 164. The ejected secondary electrons are collected by a collector grid 170 thereby leaving a charge pattern 172 on the mirrors. As described in conjunction with the attractive-mode CCM, a control pad 174 can be formed on the mirrors to improve FTU.

In the repulsive-mode configuration, each mirror 164 includes a deflectable mirror element 176 that is joined to an underlying base electrode 178 by means of an inwardly-directed electrically conductive hinge 180. Since mirror element 176 and base electrode 178 are electrically connected, they are held at the same potential. As long as the base electrode covers the entire mirror, no attractive forces can be exerted on the mirror element that could cause snap-over.

When the FEA writes charge pattern 172 onto mirror elements 176, the charge immediately distributes itself over the mirror and stabilizes at its lowest potential state. Because like charges on the bottom surface of mirror element 176 and the top surface of base electrode 178 tend to repel each other, the charge will be primarily distributed between the top surface of mirror element 176 and the bottom surface of base electrode 178 in the lowest potential state. This distribution may be skewed by the presence of the anode and the collector grid. A positive charge pattern will tend to be skewed toward the anode and vice versa.

Because there is no charge on the opposing surfaces of mirror element 176 and base electrode 178, the only repulsive forces are due to the fringing effects around the edge of the mirror. For useful mirror sizes, the fringing effects are substantially less than attractive forces for comparable mirror sizes. This may be overcome through a combination of improved hinge compliance and increased charge deposition. The hinges can be made thinner and more compliant so that the amount of deflection per unit of force is increased. The difficulty will reside in fabricating hinges that are reliable and respond uniformly over the entire array. Because the FEA is line addressed the dwell time is increased by the number of columns in the array, approximately three orders of magnitude. As a result, the FEA should be able to deposit a lot more charge on the micromirrors than a single scanning electron gun.

Membrane-Actuated

A membrane-actuated CCM 190 of the type described in copending U.S. application Ser. No. 09/172,613 filed on Oct. 15, 1998 and entitled "Membrane Actuated Charge Controlled Mirror" can be used in combination with an FEA 192. The membrane-actuated CCM features a thin insulating membrane that decouples the electron beam from the CCM. The membrane-actuated device overcomes the problems of limited deflection range, high beam current, electrostatic instability and resolution associated with known electrostatically-actuated micromirror targets, and allows the mirror to be optimized for reflectivity and video performance.

Figure 7:
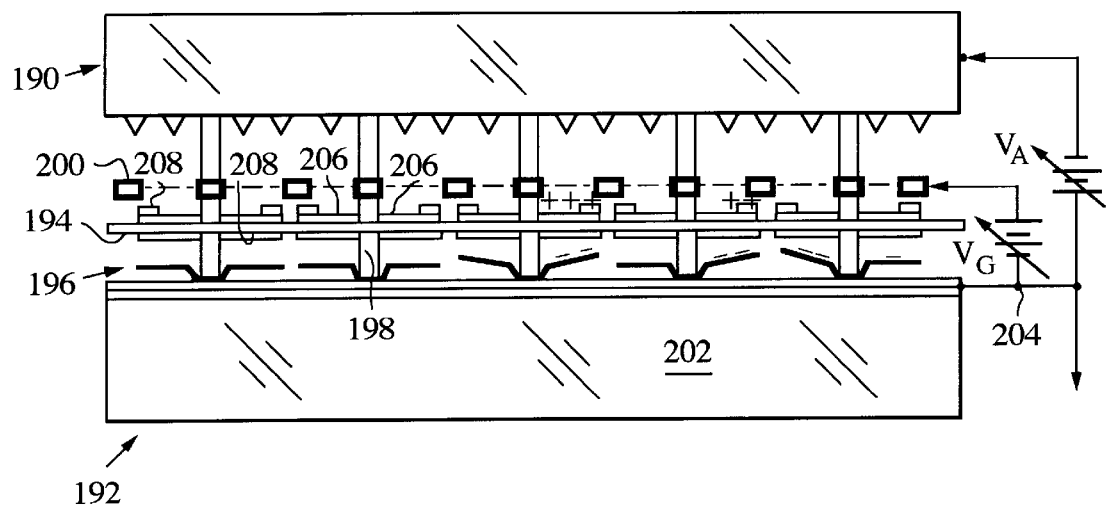
FIG. 7 is a sectional view of a membrane-actuated FEA-CCM with charge control.

As shown in FIG. 7, a thin floating potential insulating membrane 194 is inserted between FEA 190 and a micromirror array 196. Membrane 194 is typically so thin, suitably a couple microns, that it cannot support itself against the applied electric field due to the induced charge pattern and must be supported on an array of posts 198. In the preferred embodiment, posts 198 are extended to support a secondary electron collector grid 200 and FEA 190 under vacuum.

Micromirror array 196 and post array 198 are formed on a transparent substrate 202, which may be covered with a passivation layer. A conductive grid (not shown) is preferably formed on top of a very thin transparent equipotential layer 204, suitably 100 Å or less of transparent conducting film or oxide (TCF or TCO) on substrate 202. Layer 204 prevents a potential difference from being developed between the mirrors and substrate that could otherwise cause instability. The conductive grid ensures electrical continuity between all of the micromirrors and holds them all at a reference potential, suitably anode potential. Layer 204 could perform both functions, but would have to be much thicker to ensure electrical continuity, which would reduce optical efficiency.

In one particular embodiment, the mirror layer is patterned in a cloverleaf array of four centrally joined cantilever beams that share a common post region. The posts and membrane are formed with an integral gull-wing shaped structure in which the posts are located on the mirror's common post region. The membrane is formed with a number of vent holes that are spaced between the mirrors and used during processing to simultaneously release the micromirrors and membrane. This configuration allows the post to be relatively large in diameter with a smaller aspect ratio, which is desirable for fabrication considerations, without significantly reducing fill factor.

Membrane 194 is preferably sandwiched between arrays of top and bottom attractor pads, 206 and 208, which together define a capacitor array. Attractor pads 206 improve the uniformity of the actuating forces, improve resolution and can be configured to increase the useable deflection range up to approximately 83% of the mirror-to-membrane spacing. Attractor pads 208 mirror any charge deposited on pads 206 thereby effectively transferring the charge pattern deposited on the backside of the membrane to the frontside of the membrane without reducing the amount of charge seen by the mirror. This increases the deflection per unit of deposited charge. Note, adequate charge localization can be achieved by writing charge directly onto the membrane if it is coated with certain stabilizing materials such as MgO.

To actuate micromirrors 196, the line addressed FEA emits an array of fixed beams whose primary electrons are accelerated through collector grid 200 and strike the backside of membrane 194, specifically attractor pads 206, causing secondary electrons to be ejected and collected on the collector grid. This effectively writes a charge pattern onto the membrane's attractor pads 206, which is then transferred to attractor pads 208 to create localized potential differences between membrane 194 and micromirrors 196, which are held at reference potential.

The potential differences produce attractive forces that tend to pivot and deflect micromirrors 196 outward away from substrate 202 and towards membrane 194. The attractive force is opposed by the mirror hinge's spring force. The amount of deflection is determined by the force rebalance equation for a given geometry. The modulation of the beam current determines the magnitude of the potential difference and the electrostatic force exerted on mirror 196, hence the deflection of the mirror. Collector grid 200 may be biased at a potential $V_G$ below the mirrors' snap-over threshold potential to prevent the mirrors from exceeding the deflection range and snapping over to the membrane.

The membrane is erased by bringing its potential to a desired erase potential. One approach is to address control pads 208 on attractor pads 206, which respectively exhibit electron affinities above and below unity at the beam landing energy. The membrane potential is raised to the grid potential by addressing control pads 208 and then lowered to a desired potential by addressing the mirror itself Alternately, RC decay or switched collector grid techniques can be used.

Figure 8:
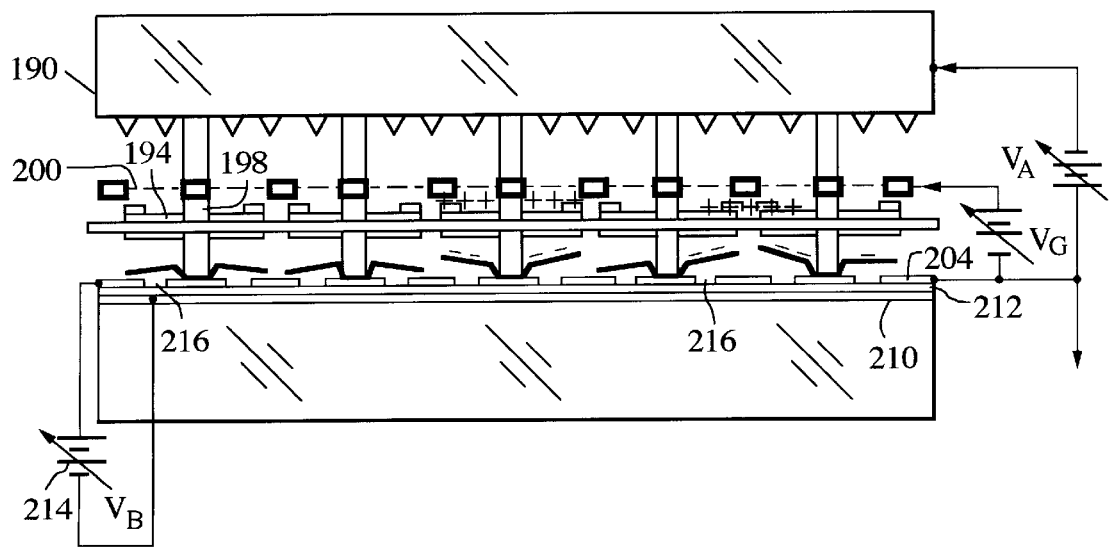
FIG. 8 is a sectional view of a membrane-actuated FEA-CCM with prebias deflection.

As shown in FIG. 8, the membrane-actuated CCM can be modified to substantially increase the deflection range. This is accomplished by increasing the height of posts 198 and raising the micromirrors so that they lie about halfway between the substrate and membrane 194. This provides enough space for the mirror to deflect without experiencing snap-over to either the substrate of the membrane.

A buried conductive layer 210 and a spacer layer 212 are formed on substrate 202 beneath layer 204. A bias potential 214 is applied between buried layer 210 and TCF or TCO layer 204 so that the potential on buried layer 210 is less than the reference potential on layer 204 and the micromirror array. In order for the individual mirrors to "see" this constant electric field, layer 204 is patterned to form apertures 216 beneath the micromirrors. Apertures 216 are preferably spaced back from the tip of the mirror to mimic the geometry of the attractor pads.

The electric field acting through apertures 216 exerts a force on the mirrors that attracts them toward the substrate. Absent any attractive force from the membrane, all of the micromirrors are held down with a bias deflection. Because the bias potential 214 is constant it can be heavily filtered to eliminate transient noise voltages that might produce a force that could cause snap-over. When charge is written onto the membrane, the membrane will exert an opposing attractive force that tends to deflect the mirror upward toward the membrane. In addition to the extended range of deflection, deflecting the mirror in both directions with respect to its natural mechanical rest position will reduce the amount of asymmetric stress on the hinge and can increase the performance and lifetime of the hinges.

Grid-Actuated

A grid-actuated CCM 230 of the type described in copending U.S. application Ser. No. 09/172,614, filed on Oct. 15, 1998 and entitled "Grid-Actuated Charge Controlled Mirror and Method of Addressing the Same" can be used in combination with a FEA 232. The grid-actuated CCM features a fine conductive mesh that is placed in close proximity to the micromirror array to serve both as the secondary electron collector grid and the reference electrode for attracting the micromirrors. The FEA operates at a landing energy where the mirrors' secondary emission coefficient is less than one to write a negative charge pattern onto the mirrors so that they are attracted to the collector grid. If the anode is also in close proximity to the array, the mirrors can be addressed so that they are selectively deflected toward the grid and the anode. This configuration overcomes the problems of limited deflection range and instability associated with known attractive-mode devices. The mirror-to-grid spacing can be made large enough to provide an adequate deflection range without posing a significant risk of snap-over.

Figure 9:
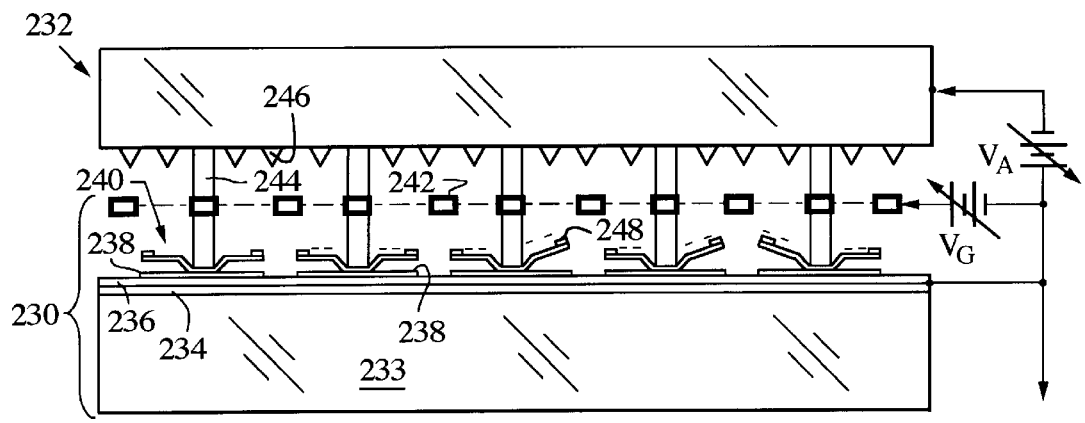
FIG. 9 is a sectional view of a collector-grid actuated FEA-CCM with charge control.

As shown in FIG. 9, the CCM 230 includes a glass substrate 233 that is coated with a conductive layer 234 that is held at anode potential, an insulating layer 236, and an array of electrically isolated conductive pads 238 that support respective micromirrors 240. The conductive pads effectively shield the micromirrors from any static or stray charge that may accumulate on the substrate that would otherwise produce attractive forces. A fine conductive mesh 242, i.e. the collector grid, is supported on an array of insulating posts 244 above micromirrors 240, suitably 10–20 microns, and biased with a positive potential $+V_G$ with respect to the anode potential. To improve fill factor, the insulating posts are preferably formed in the mirrors' post regions and are extended to support the FEA under vacuum. The FEA, collector grid and micromirror array are aligned so that at least one field emitter 246 is aligned with each micromirror 240. In the embodiment shown, at least one field emitter 246 is also aligned to a control pad 248 on the mirror. Control pad 248 is formed from a secondary emission material and is used during erasure to achieve frame time utilizations approaching 100%.

The potential difference between the collector grid and the anode potential establishes a uniform electric field around micromirrors 240 such that the collector grid has a net positive charge Q and the anode electrode has an equal but opposite charge −Q. In the absence of any deposited charge, the mirror potential stabilizes at a potential between the anode potential and the grid potential such that it satisfies the electric field between the anode and the grid. The exact value of the mirror potential depends on the geometry of the collector grid and anode and their relative spacing to the micromirror. Although the net charge on each micromirror is zero, the free electrons in the conductive mirror metal will distribute themselves so that an amount of negative charge −Q will reside on the top surface of the mirror and an equal amount of positive charge Q will reside on the underside of the mirror. The charge disparity produces an electric field that cancels the uniform electric field so that the electric field inside the conductive mirror is zero and produces equal and opposite attractive forces on the micromirror. Since the net force is zero the micromirror does not move.

FEA 232 emits primary electrons that are accelerated through a potential $V_A$ towards the anode potential. The primary electrons pass through collector grid 242 and strike micromirrors 240 causing secondary electrons to be ejected and collected by collector grid 242. The net charge on the micromirrors can be driven positive by operating between the first and second crossovers on the mirror's secondary electron emission curve and negative by operating outside that region. The beam current and emission coefficient together determine the amount of charge.

When the source writes a charge pattern onto micromirror 240, the charge seeks the lowest potential state on the surface of the micromirror. If the net charge is negative, the charge will reside on top of the micromirror opposite collector grid 242. Conversely if the net charge is positive, the charge will reside on the underside of the micromirror opposite the anode potential.

The net charge modulates the mirror potential, which produces a force imbalance on the micromirror that causes it to deflect. Known micromirror targets such as the Westinghouse device, position the micromirrors very close (4–5 microns) to the anode potential, e.g. an anode electrode on the surface of the substrate, and very far away (200 microns) from the open mesh collector grid, and operate above the first crossover and below the second crossover so that the mirror is attracted to the substrate. As noted above, this configuration is unstable and has limited deflection range.

As depicted in FIG. 9, FEA 232 is operated at landing energies below the first crossover or above the second crossover to write a negative charge pattern onto the mirrors and collector grid 242 is positioned close enough to the micromirrors, suitably 10–20 microns, to cause the mirror to be deflected toward the collector grid. To provide an adequate reference, the grid must have a fine spacing. Typically, at least one cell per micromirror. The open conductive mesh used in known targets is not adequate. Although close enough to attract the mirrors, collector grid 242 is sufficiently far away to provide a large deflection range and avoid instability problems.

The charge pattern is erased by addressing control pad 248, which has an emission coefficient greater than one at the FEA beam energy, to raise the mirror potential up to the collector grid potential. Instead of erasing each mirror, it is possible to selectively address the mirror and the control pad to differentially write the desired amount of charge. The FEA is ideally suited to this particular CCM configuration because its field emitters are easily capable of the subpixel resolutions required to address both the exposed portion of the mirror and the control pad. Before the next charge pattern can be written onto the micromirror, FEA 232 must first deposit enough negative charge onto the mirrors to offset the positive charge associated with driving the mirrors to the grid potential. Once the mirrors are neutralized, FEA 232 can then deposit a negative charge pattern onto the mirrors to produce the attractive forces that deflect the mirrors toward the collector grid.

Figure 10:
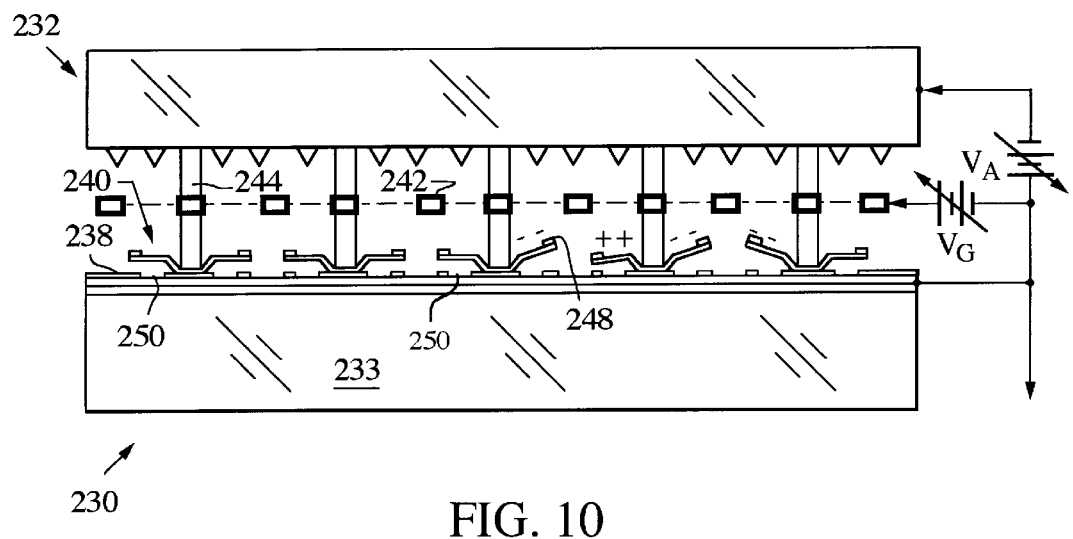
FIG. 10 is a sectional view of a dual-actuated FEA-CCM.

As shown in FIG. 10, the deflection range of the mirror can be increased by a) increasing the post height of mirror 240 and increasing the grid-to-substrate spacing and b) forming an aperture 250 in each conductive pad 238 beneath the micromirror. Alternately, the anode could be formed as a reference grid on the surface of the substrate. When control pad 248 is addressed, the mirror is not merely erased but is deflected its maximum amount toward the substrate. When the exposed portion of the mirror is addressed, the force balance shifts toward the collector grid and the mirror is deflected back toward the collector grid. To provide symmetry, the maximum deflection in both directions is about the same. This not only doubles the deflection range but prevents certain hinges from developing an offset due to their crystal grain structure over time.

Attracting the micromirrors toward the substrate does raise concern about snapover and stiction so common in known devices. Should the mirror snap-down it will be in contact with its conductive pad 238, which is held at the same potential. Although this will not eliminate stiction due to the Van der Waals forces, it will improve the problem. The tradeoff is some amount of charge dilution. Some of the positive charge deposited on the mirror will move to the conductive pad. The larger the hole, the less charge dilution. Furthermore, since the mirror potential is limited by the collector grid potential, the CCM geometry and bias conditions can be configured such that the threshold voltage for snap-over exceeds the collector grid potential $+V_G$. This prevents snap-over.

Although control pads 248 effectively increase the FTU to approximately 100% they do so at the cost of doubling the number of column leads to the FEA. The increased fan out may be a problem on small display sizes. An alternative approach that produces the same result is illustrated in FIG. 11, in which the mirrors are coated with MgO to stabilize the secondary emission coefficient and the landing energy is modulated around one of the crossover points to write and erase the micromirrors. The low voltage (<1000V) required by the mirrors for actuation makes it feasible to switch each row cathode/emitter between a small magnitude voltage, close to ground, giving a low landing energy where $\delta<1$ and a large magnitude voltage, above the first crossover, giving a high landing energy where $\delta>1$. This can be accomplished by connecting a voltage divider 260 comprised of series resistors R1 and R2 across bias voltage $V_A$, which produces landing energies between the crossovers, that are ratioed such that the voltage between R1 and R2 is below the first crossover. A switch 262, suitably a HEXFET, switches the row cathode/emitter from one position to another to first erase then write a given row of mirrors. This same technique can be used with the attractive, repulsive and membrane-actuated modes of operation.

As discussed in FIGS. 5 through 12, in addition to being actuated in several different ways; attractive, repulsive, membrane and grid actuated, the CCM can be addressed using several different techniques including RC-decay, write/erase charge control, differential charge control and dual-deflection charge control as shown in FIGS. 12a through 12d, respectively. RC-decay is the simplest but provides the poorest FTU, approximately one-third of the available light is modulated. As shown in FIG. 12a, the micromirrors are driven to a desired deflection 300 and allowed to decay as the charge on the mirror or membrane bleeds off. Charge control involves selectively addressing a control pad and the mirror/membrane but provides FTU approaching 100%. As shown in FIG. 12b, the micromirrors are first driven to an erase state 302 and are then driven to a write state 304 where they are held throughout the frame. As shown in FIG. 12c, the micromirrors are differentially driven from one write state 306 to the next. As shown in FIG. 12d, the micromirrors are first driven to an erase state 308 that correspond to the maximum deflection toward the substrate and are then drive to a desired write state 310.

Although the FEA-CCM has been described in the context of a monochrome scale display, the invention is equally applicable to color displays. As mentioned earlier, a color projection display can be implemented using a color wheel in what is commonly referred to as color sequential. Also, a color display can be implemented by using three light valves each with its respective color filter or by having mirror triads to allow spatial color separation. In the later case the three-elements in a triad each deflect along different axis and the resulting light beams pass through their respective color filters before being recombined into the projected color beam. The compactness of the FEA-CCM lends itself to another color display architecture in which three FEA-CCMs are mounted on three different sides of a color cube, which combines three TIR prisms. This mode of operation is similar to above and differs only as a result of the color cube.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A light modulator, comprising:
   a thin vacuum cell having a transparent faceplate;
   a charge controlled mirror (CCM) in said vacuum cell adjacent the interior surface of said faceplate, said CCM comprising an array of electrostatically-actuable micromirrors;
   a collector grid in said vacuum cell; and
   a field emitter array (FEA) in said vacuum cell that comprises an array of field emitter tips that emit primary electrons, said primary electrons accelerating through said collector grid and striking the backside of the CCM causing secondary electrons to be ejected and collected on the collector grid leaving a charge pattern on the backside of the CCM that produces electrostatic forces that deflect said micromirrors.

2. The light modulator of claim 1, wherein said CCM further comprises a transparent substrate that supports the array of micromirrors and provides the cell's faceplate.

3. The light modulator of claim 1, wherein said micromirrors deflect outward away from said faceplate and toward said FEA.

4. The light modulator of claim 3, wherein each said micromirror is mounted on a conductive pad so that said micromirror and said conductive pad are at the same potential.

5. The light modulator of claim 4, wherein said CCM further comprises a buried layer that is held at a fixed potential with respect to said micromirror, said conductive pad having a hole beneath the micromirror so that said micromirror is biased towards said faceplate.

6. The light modulator of claim 3, wherein said CCM further comprises an array of control pads on the backside of said CCM, one of said control pads and the backside of said CCM exhibiting a secondary emission coefficient less than one and the other exhibiting a secondary emission coefficient greater than one, said plurality of field emitter tips alternately delivering primary electrons to said control pads and the backside of said CCM to refresh the charge pattern at a video rate.

7. The light modulator of claim 6, wherein said field emitter tips first deliver charge to said control pads to deflect said mirrors to an erase position and then deliver charge to the backside of the CCM to deflect said mirrors to a next write position.

8. The light modulator of claim 6, wherein said field emitter tips selectively deliver charge to said control pads and the backside of said CCM such that the charge pattern is differentially written onto the CCM causing the mirrors to deflect from one write position to the next.

9. The light modulator of claim 3, wherein the backside of the CCM is coated with a secondary emission material to stabilize its secondary emission coefficient, said FEA emitting primary electrons at different landing energies such that the secondary emission material emits secondary electrons with secondary emission coefficients greater than and less than one to erase and write the charge pattern.

10. The light modulator of claim 3, wherein the backside of the CCM is the surface of the micromirrors facing the FEA, said charge pattern having a negative polarity that causes the micromirrors to be electrostatically attracted toward said collector grid.

11. The light modulator of claim 3, wherein the backside of the CCM is the surface of the micromirrors facing the FEA, each said micromirror comprising a deflectable mirror element that is joined to an underlying base electrode by an inwardly-directed electrically conductive hinge, said deflectable mirror elements being repulsed away from their underlying base electrodes in accordance with the charge pattern.

12. The light modulator of claim 3, wherein said charge pattern is written onto a thin insulating membrane that decouples the micromirrors from said FEA causing said micromirrors to be deflected toward said membrane.

13. The light modulator of claim 1, wherein each said micromirror comprises a deflectable mirror element that is suspended above an underlying reference electrode that is held at a reference potential, said charge pattern creating potential differences between the deflectable mirror elements and their underlying reference electrodes that causes the mirror elements to deflect toward their reference electrodes.

14. The light modulator of claim 13, wherein said charge pattern increases the micromirror potentials toward the potential of the collector grid so that the potential differences between the micromirrors and the reference electrode deflect the mirror elements, said micromirrors being susceptible to snap-over when the potential difference exceeds a threshold potential, said collector grid being biased at a grid potential that is less than said threshold potential.

15. The light modulator of claim 13, wherein said reference electrodes comprise a buried layer that extends beneath all of said micromirrors and is biased at said reference potential, an insulating layer on said buried layer, and an array of electrically isolated conductive pads on said buried layer that support said respective micromirrors so that the conductive pads and the micromirrors are at the same potential, said conductive pads each having an aperture through which the potential differences between the micromirrors and buried layer can deflect the micromirrors.

16. The light modulator of claim 1, further comprising an array of posts that extend from said faceplate to said FEA to hold off atmospheric pressure.

17. A light modulator, comprising:
a thin vacuum cell having a transparent faceplate;
a charge controlled mirror (CCM) having a plurality of electrostatically-actuable electrically isolated micromirrors on said faceplate, each said micromirror having a deflectable mirror element that is joined to an underlying base electrode by an electrically conductive hinge;
a collector grid in said vacuum cell;
a field emitter array (FEA) in said vacuum cell that comprises an array of field emitter tips that emit primary electrons, said primary electrons accelerating through said collector grid and striking the micromirrors causing secondary electrons to be ejected and collected on the collector grid leaving a charge pattern on the array of micromirrors that distributes itself over the mirror element and base electrode to produce electrostatic fringing forces that repel said mirror elements outward away from their respective underlying electrodes.

18. The light modulator of claim 17, wherein said micromirrors exhibit a secondary emission coefficient less than one, further comprising a control pad on each said micromirror that exhibits a secondary emission coefficient greater than one, said plurality of field emitter tips alternately delivering primary electrons to said control pad and said micromirror to refresh the charge pattern at a video rate.

19. The light modulator of claim 18, wherein said field emitter tips first deliver charge to said control pad to deflect said micromirror to an erase position and then deliver charge to the micromirror to deflect it to a next write position.

20. The light modulator of claim 18, wherein said field emitter tips selectively deliver charge to said control pad and the micromirror such that the charge pattern is differentially written onto the array of micromirrors causing the mirrors to deflect from one write position to the next without erasure.

21. A light modulator, comprising:
a thin vacuum cell having a transparent faceplate;
a charge controlled mirror (CCM) having a plurality of electrostatically-actuable electrically isolated micromirrors on said faceplate;
a collector grid biased at a grid potential; and
a field emitter array (FEA) having an array of field emitter tips that emit primary electrons which are accelerated through said collector grid and strike the micromirrors thereby ejecting secondary electrons and depositing a negative charge pattern on said micromirrors,
said collector grid collecting the ejected secondary electrons and producing attractive electrostatic forces that deflect said micromirrors toward said collector grid in accordance with the difference between said grid potential and the respective micromirror potentials induced by said negative charge pattern.

22. The light modulator of claim 21, wherein the collector grid has an array of uniformly sized and spaced cells, at least one per micromirror, that are aligned with a plurality of said field emitter tips on one side and one said micromirror on the other side.

23. The light modulator of claim 21, further comprising a control pad on each said micromirror, said plurality of field emitter tips alternately delivering primary electrons to said control pad and said micromirror to refresh the charge pattern at a video rate.

24. The light modulator of claim 21, wherein the micromirrors are coated with a secondary emission material to stabilize their secondary emission coefficient, said FEA emitting primary electrons at different landing energies such that the secondary emission material emits secondary electrons with secondary emission coefficients greater than and less than one to erase and write the charge pattern.

25. The light modulator of claim 21, further comprising a reference electrode spaced apart from said micromirror array opposite said collector grid, said FEA selectively depositing said negative charge pattern and a positive charge pattern onto said micromirrors so that they respectively deflect toward said collector grid and said reference electrode.

26. The modulator of claim 25, wherein said reference electrode comprises a buried layer on said faceplate beneath said micromirror array, each said micromirror being supported on a conductive pad that assumes the same potential as said mirror, each said conductive pad having a hole through which said anode potential can attract said micromirror.

27. A light modulator, comprising:
a vacuum cell having a transparent faceplate;
a charge controlled mirror (CCM) mounted in said vacuum cell, comprising,
an array of electrostatically-actuable pivotable micromirrors on said faceplate that are held at an reference potential;
an array of insulating posts on said faceplate;
a thin floating-potential insulating membrane supported on said insulating posts above said array of micromirrors; and
a collector grid that is spaced apart from said membrane opposite said array of micro mirrors; and
a field emitter array (FEA) that is supported on said insulating posts in said vacuum cell and emits primary electrons that are accelerated through said collector grid and strike the backside of said insulating membrane causing secondary electrons to be ejected and collected on the collector grid thereby leaving a charge pattern on said membrane that produces finely-resolved attractive electrostatic forces that cause said micromirrors to pivot and deflect toward the membrane.

28. The light modulator of claim 27, further comprising a transparent equipotential layer between said faceplate and said array of micromirrors that shields said micromirrors from charge accumulation on said faceplate.

29. The light modulator of claim 28, further comprising a conductive grid on said equipotential layer that ensures electrical continuity between said micromirrors.

30. The light modulator of claim 28, wherein said equipotential layer has an array of holes beneath respective micromirrors, further comprising:
an insulative layer beneath said equipotential layer; and
a buried conductive layer between said insulative layer and said faceplate that is held at a constant potential, said constant potential creating an electric field through said holes with respect to said reference potential that establishes a constant attractive force on said micromirrors that biases them downward toward said faceplate.

31. The light modulator of claim 27, further comprising:
an array of conductive pads on the backside of said membrane that are aligned with said array of micromirrors, said FEA writing said charge pattern onto said conductive pads such that each micromirror's charge is distributed uniformly across the corresponding conductive pad.

32. The light modulator of claim 31, further comprising:
an array of conductive pads on the frontside of said membrane facing and aligned with said array of micromirrors, said conductive pads on the membrane's backside and frontside forming an array of series capacitors so that charge deposited on said backside conductive pads produces mirror charges on said frontside conductive pads opposite said micromirrors.

33. The light modulator of claim 32, further comprising a control pad on said backside conductive pads, which exhibit opposite secondary emission coefficients.

34. The light modulator of claim 27, wherein the membrane is coated with a secondary emission material to stabilize its secondary emission coefficient, said FEA emitting primary electrons at different landing energies such that the secondary emission material emits secondary electrons with secondary emission coefficients greater than and less than one to erase and write the charge pattern.

35. A light modulator, comprising
a thin vacuum cell having a transparent faceplate;
a charge controlled mirror (CCM) in said vacuum cell adjacent the interior surface of said faceplate, said CCM comprising an array of electrostatically-actuable micromirrors in which each micromirror comprises a deflectable mirror element that is supported above an underlying reference electrode that is held at a reference potential, said micromirrors being susceptible to snap-over when the potential difference between the mirror element and the reference electrode exceeds a threshold potential;
a collector grid in said vacuum cell that is biased at a grid potential below said threshold potential; and
a field emitter array (FEA) in said vacuum cell that comprises an array of field emitter tips that emit primary electrons, said primary electrons accelerating through said collector grid and striking the micromirrors causing secondary electrons to be ejected and collected on the collector grid leaving a charge pattern on the mirror elements that increases their potentials toward said grid potential thereby producing electrostatic forces that deflect said mirror elements toward said reference electrode.

36. The light modulator of claim 35, wherein said reference electrodes comprise a buried layer that extends beneath all of said micromirrors and is biased at said reference potential, an insulating layer on said buried layer, and an array of electrically isolated conductive pads on said buried layer that support said respective micromirrors so that the conductive pads and the micromirrors are at the same potential, said conductive pads each having an aperture through which the potential differences between the micromirrors and buried layer can deflect the micromirrors.

37. The light modulator of claim 35, further comprising a control pad on each said micromirror, said plurality of field emitter tips alternately delivering primary electrons to said control pad and said micromirror to refresh the charge pattern at a video rate.

38. The light modulator of claim 35, wherein the micromirrors are coated with a secondary emission material to stabilize their secondary emission coefficient, said FEA emitting primary electrons at different landing energies such that the secondary emission material emits secondary electrons with secondary emission coefficients greater than and less than one to refresh the charge pattern at a video rate.

* * * * *